(12) United States Patent
Kumar et al.

(10) Patent No.: US 11,528,236 B2
(45) Date of Patent: Dec. 13, 2022

(54) USER-BASED DATA TIERING

(71) Applicant: EMC IP Holding Company LLC, Hopkinton, MA (US)

(72) Inventors: Shiv S. Kumar, Pune (IN); Jai P. Gahlot, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/137,804

(22) Filed: Dec. 30, 2020

(65) Prior Publication Data
US 2022/0210093 A1 Jun. 30, 2022

(51) Int. Cl.
| G06F 15/173 | (2006.01) |
| H04L 47/70 | (2022.01) |
| H04L 67/1074 | (2022.01) |
| G06F 16/9035 | (2019.01) |
| H04L 47/74 | (2022.01) |
| H04L 67/5682 | (2022.01) |

(52) U.S. Cl.
CPC ........ *H04L 47/828* (2013.01); *G06F 16/9035* (2019.01); *H04L 47/745* (2013.01); *H04L 47/822* (2013.01); *H04L 67/1076* (2013.01); *H04L 67/5682* (2022.05)

(58) Field of Classification Search
CPC ............... G06F 16/9035; H04L 47/828; H04L 67/2852; H04L 67/1076
USPC ................ 709/226, 212, 213, 214, 215, 216
See application file for complete search history.

(56) References Cited

U.S. PATENT DOCUMENTS

| 7,636,736 B1 | 12/2009 | Kumar et al. |
| 9,367,579 B1 | 6/2016 | Kumar et al. |
| 11,045,730 B1* | 6/2021 | Goldman ................ A63F 13/28 |
| 2006/0136356 A1 | 6/2006 | Hua et al. |
| 2012/0030242 A1 | 2/2012 | Nakamura et al. |
| 2013/0013850 A1 | 1/2013 | Baderdinni |
| 2018/0089224 A1* | 3/2018 | Muthuswamy ......... H04L 67/06 |
| 2018/0314680 A1 | 11/2018 | Dorai et al. |
| 2021/0075733 A1* | 3/2021 | Szigeti ................ H04L 47/2458 |
| 2021/0240605 A1* | 8/2021 | Mills .................... G06F 12/0223 |
| 2022/0019372 A1* | 1/2022 | Vastrad ................. G06F 3/0652 |

OTHER PUBLICATIONS

Non-Final Office Action received for U.S. Appl. No. 17/120,475 dated Apr. 8, 2022, 50 pages.

(Continued)

*Primary Examiner* — Lan Dai T Truong
(74) *Attorney, Agent, or Firm* — Amin, Turocy & Watson, LLP

(57) ABSTRACT

Techniques are provided for user-based data tiering. In an example, a computer maintains a first-in-first-out queue that logs a finite set of users that have most-recently modified a file. This queue can be maintained in an extended attribute of an inode that corresponds to a file. A computer can also maintain a policy that defines how to perform storage tiering on a file based on which users have accessed the file. When a tiering operation is performed, the files specified by a corresponding tiering policy can be evaluated for which users have recently accessed them. When a user specified by the tiering policy has recently modified a file, the file can be placed in tiering queue for tiering.

20 Claims, 11 Drawing Sheets

(56) References Cited

OTHER PUBLICATIONS

Buchholz et al., "On the Role of File System Metadata in Digital Forensics", Published in Journal of Digital Investigation, vol. 1, No. 4, Dec. 2004, pp. 297-308.
Final Office Action received for U.S. Appl. No. 17/120,475 dated Sep. 14, 2022, 62 pages.

* cited by examiner

USER-BASED DATA TIERING

TECHNICAL FIELD

The present application relates generally to storing files in computer storage systems.

BACKGROUND

Computer storage systems can provide data storage, modification and access to multiple users. This data can be represented as files in a computer file system. In some examples, multiple users can access and modify the same file.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
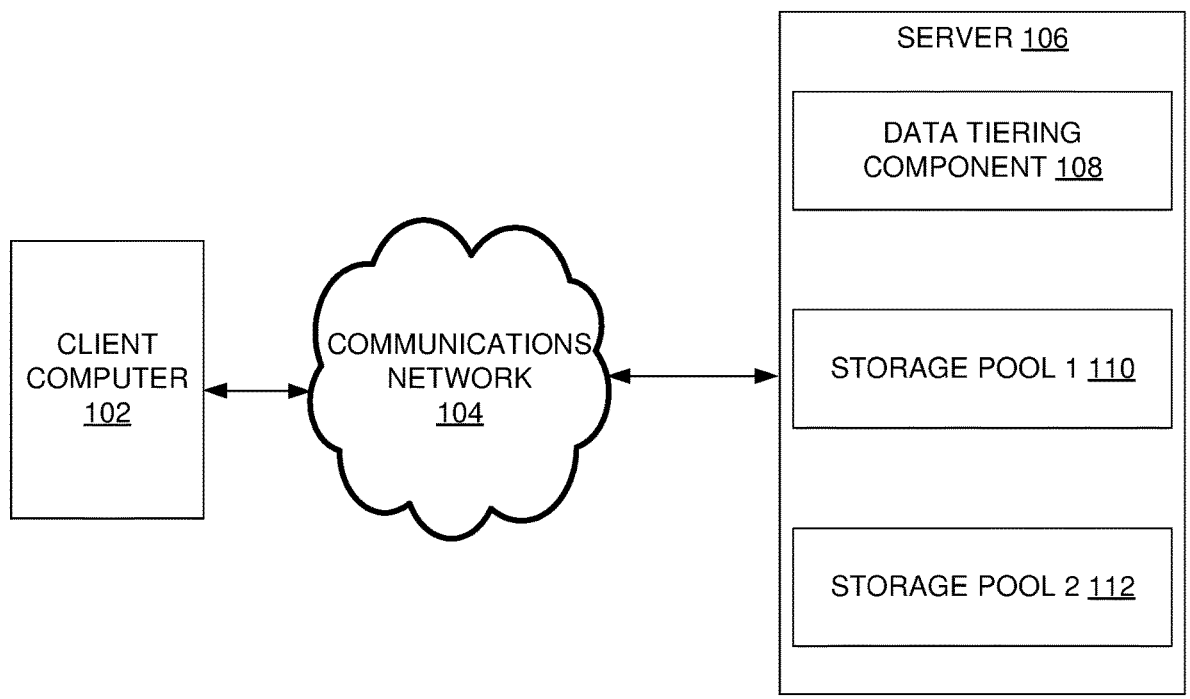
FIG. 1 illustrates an example system architecture that can facilitate user-based data tiering, in accordance with certain embodiments of this disclosure.

A filepool can generally comprise a set of files that are determined, or filtered, based on some attributes. For example, a filepool can be based on time-based attributes for the dates that the files were last accessed, modified, or created. A time-based attribute can be relative, such as within the past 30 days. In some examples, other filtering criteria can include file type, name, size, and custom attributes. That is, a filepool can generally comprise a specific set of important files, frequently-accessed files, or a specific type of files.

A filepool policy can generally comprise a rule that defines what to do with a filepool in terms of storage, movement, and protection. For example, a filepool policy can be utilized to define and store a filepool on a storage tier for fast access or archival purposes.

A storage pool can generally comprise different kinds of storage tiers within one storage cluster. For instance, one storagepool can comprise solid-state drive (SSD) storage for high throughput, and another storagepool can comprise tape storage for archiving rarely-accessed files.

In some examples, an administrator can define filepool policies to move different filepools among storagepools within a storage cluster.

Computer storage systems can employ storage tiering where cold data (e.g., data that is infrequently accessed) can be sent to a less performant storage (e.g., storage that has a longer response time for a data access compared to another type of more performant, faster storage). In some examples, storage tiering can be implemented with storagepools, where each storagepool represents a storage tier. Storage policies can be defined that identify attributes like a directory path or various filters, and these storage policies can be adhered to when moving data among storagepools.

In some examples, a different quality of service (QoS) can be provided to different users based on how much they pay to utilize a storage system. Where a storage system has several types of premium users, more of premium users' data can be kept in a high performant storagepool relative to non-premium users' data. In some examples, implementing a better QoS for premium users can involve having filepool policies that are user aware, in the sense that the policies can identify data modified by premium users. A filepool This lack of different QoS in a storagepool between different users can be a problem in prior techniques for implementing storagepools.

In an example, there can be users U1 and U2, where U1 is a high priority user and U2 is a low priority user. In some examples, one or more users can be assigned a priority by an administrator, and this can be stored in a database of a system that implements user-based data tiering. In some examples, a user priority can be an integer, ranging from 1-10. The database can be queried to return the priority for a specific user, and can be queried to return a list of users that meet a specific priority criteria (e.g., priority <7).

Additionally, there can be storagepools P1 (which is expensive and high performant) and P2 (which is cheap and low performant) In this example, an administrator of the storage system can define the following policies:

Data for user U1 should be moved to storagepool P2 after 6 months of no activity.

Data for user U2 should be moved to storagepool P2 after 2 months of no activity.

Additionally, according to the present techniques, a filepool policy can be utilized to filter out files edited by a set of critical users. In some examples, multiple users can have access to a shared directory, and these users can have different levels of criticality of roles. In such examples, each user's definition of hot data (e.g., data that is frequently accessed) and cold data can vary based on a QoS of a storage system. In some examples, filepool policies can be defined to keep data of highly critical users on a high performant storage tier, and keep data of non-critical users on a low performant storage tier.

The present techniques can facilitate moving files edited by a specific user or set of users, and so can meet different data movement requirements for different users across different storage tiers. The present techniques can provide for an ability to differentiate between files belonging to, or written by, different levels of users in a filepool policy; can provide for finer control of what data is moved and when; and, in a cloud setting, can provide for an archival solution to provide a better QoS for premium subscribers.

A storage system can determine a latest number N of users who have edited a file. In an example, tracking users for a tiering policy can involve doing the following when a new file is created, or an existing file is modified.

Tiering policies can be defined and executed based on a user name or user id. When defining a tiering policy, an administrator of a storage system can declare specific user ids along with other configuration parameters. For example:

Create Tiering Policy TP1:
Users_TP1: bob, charlie, forest
Dir_TP1: /ifs/data1

A tiering policy according to this example can be created to move only those files in /ifs/data1 that have been modified or created by users bob, charlie, or forest.

In an example, the following process for a user-aware tiering policy can be utilized to move files edited by configured "Users_TP$_i$." These steps can be performed on the start of every tiering job TP$_i$.

1. Get the list of files
2. for each file f in the list of files identified:
2.1 If extended attribute "editors_tp$_i$" available for f?
　2.1.1 Yes:
　　2.1.1.1 If Users_TP$_i$ ∈Q(f, tp$_i$)
　　2.1.1.2 Put file f in the tiering queue
　2.1.2 No:
　　2.1.2.1 Create file extended attribute editors_tp$_i$
　　2.1.2.2 Set Q(f, tp$_i$)=Ø

After a new tiering policy is established, user_ids identified in Users_TPi can be edited to editors_tp$_i$ of each file set up to be moved by policy tp$_i$, whenever a user writes to f.

A user priority based tiering policy can be defined and implemented. In some examples, when defining a tiering policy, an administrator of a storage system can declare a specific user priority along with other configuration parameters. For example:

Create Tiering Policy TP2:
Users_TP2_Priority: 7
Rule: "<"
Dir_TP2: /ifs/data1

This example policy can be created to move those files in /ifs/data1 that have been modified or created by users having a priority less than 7. In an example, the following process for a user-aware tiering policy can be utilized to move files edited by configured "Users_TPi."

Perform below steps on start of every Tiering job TP$_i$:
1. Get the list of files
2. Read the required user priority from Tiering Policy definition as P
3. Read the required user priority Rule from Tiering Policy definition as R
4. for each file f in the list of files identified:
4.1 If extended attribute "editors_tp$_i$" available for f?
　4.1.1 Yes:
　　4.1.1.1 For each user U in Users_TPi
　　　4.1.1.2 If Priority(U) satisfies Rule R for priority P
　　　4.1.1.3 Put file f in the tiering queue
　4.1.2 No:
　　4.1.2.1 Create file extended attribute editors_tp$_i$
　　4.1.2.2 Set Q(f, tp$_i$)=Ø

Prior approaches to data tiering can lack a way to filter out and move only those files that are modified by a set of users. In such approaches, these files are treated equally when it comes to data tiering, irrespective of who has modified the file. In other words, there is no mechanism of prioritizing files in a data tiering job based on a criticality of a user.

Approaches according to the present techniques can provide an ability to differentiate between files belonging to, or written by, different levels of users in a tiering policy; can provide additional control to what data is moved and when; and in a cloud setting, can provide for an archival solution to provide an improved QoS for premium subscribers.

In some examples, a heat score for files can be utilized in implementing user-based data tiering. There can be file-heat-based tiering policies, where "heat" indicates a frequency of access of files, and hottest files can be tiered to a high-performance storage tiers. In such examples, the heat score for a file can be weighted based on a priority of a user or group that accesses the file.

In some examples, a weighted heat score for a file can be determined based on a number of accesses of the file, weighted by a priority of users identified as having recently accessed the file (as indicated in a queue, as described below). For example, the number of accesses of the files can be multiplied by an average user priority of users having recently accessed the file.

Example Architecture

FIG. 1 illustrates an example system architecture 100 that can facilitate user-based data tiering, in accordance with certain embodiments of this disclosure. As depicted, system architecture 100 comprises client computer 102, communications network 104, and server 106. In turn, server 106 comprises data tiering component 108, storagepool 1 110, and storagepool 2 112.

Figure 11:
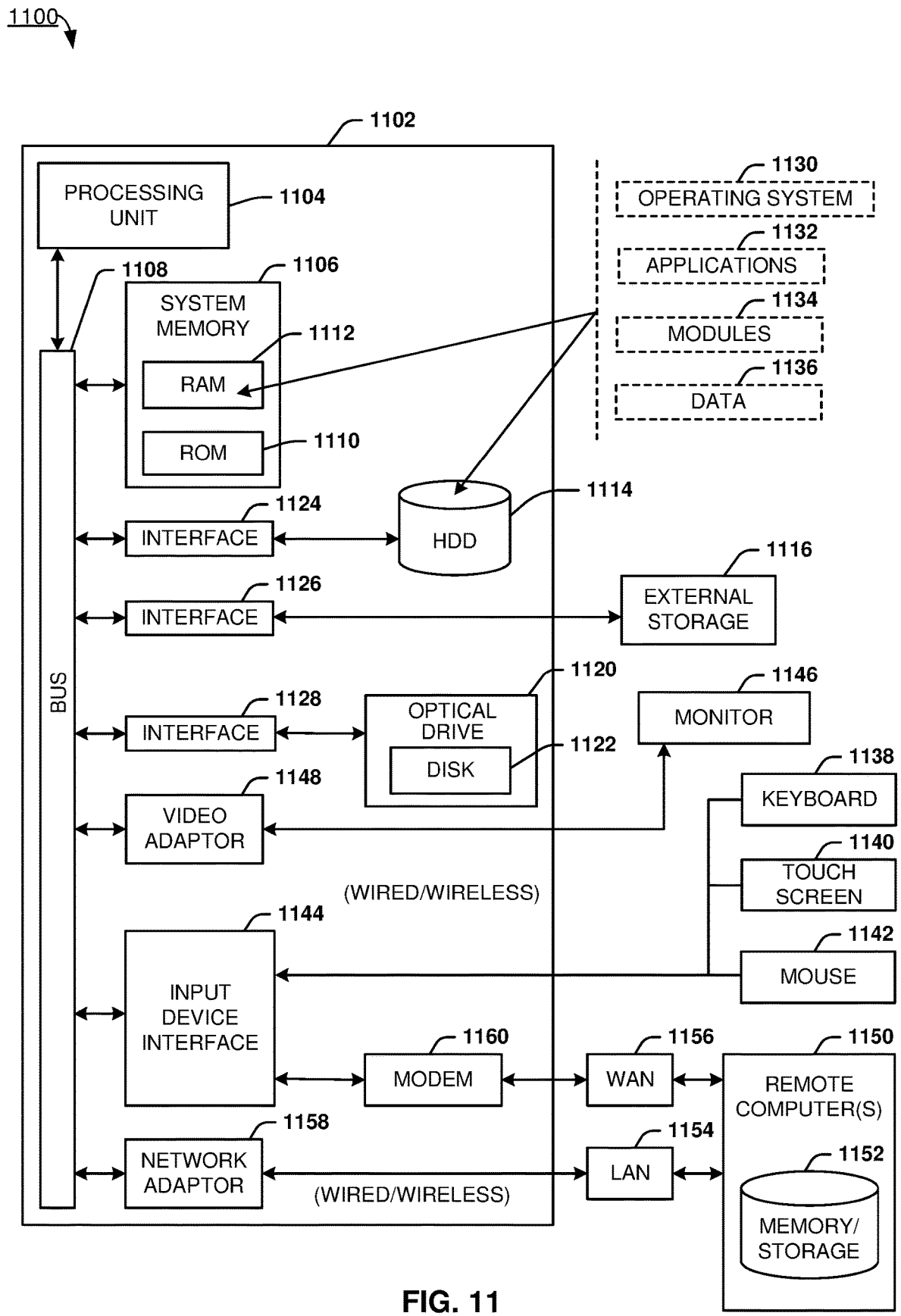
FIG. 11 illustrates an example block diagram of a computer operable to execute certain embodiments of this disclosure.

Each of client computer 102 and server 106 can be implemented with one or more instances of computer 1102 of FIG. 11. In some examples, server 106 comprises a distributed storage system that comprises multiple instances of computer 1102 of FIG. 11. In some examples, data tiering component 108 can be implemented with machine-executable instructions and/or aspects of computer 1102 of FIG. 11.

Communications network 104 can comprise a computer communications network, such as the INTERNET, or an isolated private computer communications network.

Client computer 102 can access server 106 via communications network 104. In some examples, client computer 102 can access computer storage resources provided by server 106, such as to read, write, create, or delete one or more files stored in storagepool 1 110 or storagepool 2 112.

Data tiering component 108 can be used to implement user-based data tiering across storagepool 1 110 and storagepool 2 112. That is, data tiering component 108 can transfer files between storagepool 1 110 and storagepool 2 112 based on criteria of those files, such as which users have most recently accessed a particular file.

In some examples, when a user of client computer 102 modifies a file on server 106, data tiering component 108 can log that the user modified this file. Data tiering component 108 can maintain a list of users that have modified a file using an extended attribute of an Mode used to store that file.

In some examples, data tiering component 108 can maintain a first-in-first-out (FIFO) queue in an extended attribute of users who have modified a particular file. A FIFO queue can generally comprise a two-dimensional, ordered data structure where elements are added to a first end of the data structure and removed from a second end of the data structure. In this manner, the first item that has been added to the data structure can eventually become the first item that is removed from the data structure. As applied to user file modifications, a FIFO queue can be used to track the N users who have most recently modified a file, where N is a maximum number of users that can be stored in the FIFO queue.

At a given point in time, those users identified in this FIFO queue in the extended attribute can be considered to be the set of users who have recently modified the corresponding file for a given policy.

Figure 2:
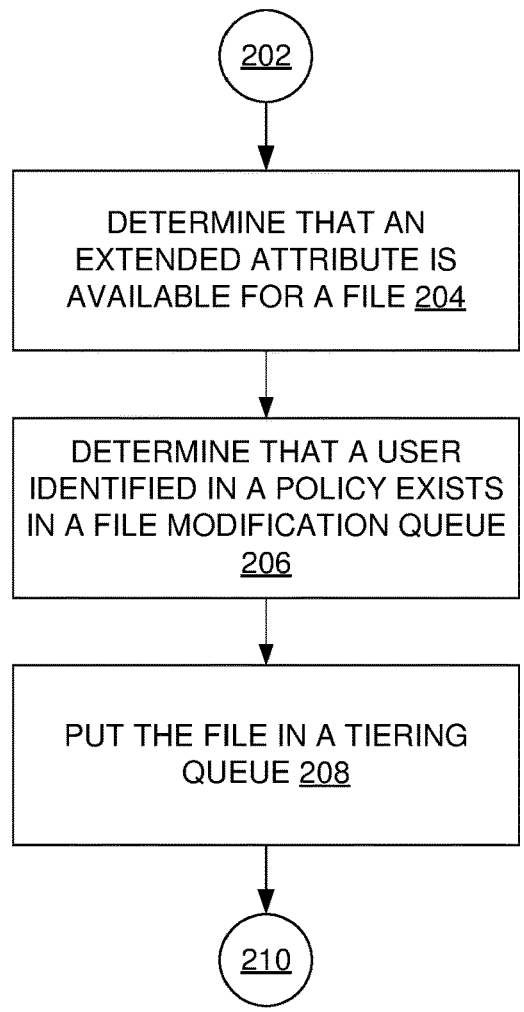
FIG. 2 illustrates an example process flow for processing a file for tiering to facilitate user-based data tiering, in accordance with certain embodiments of this disclosure.
Figure 3:
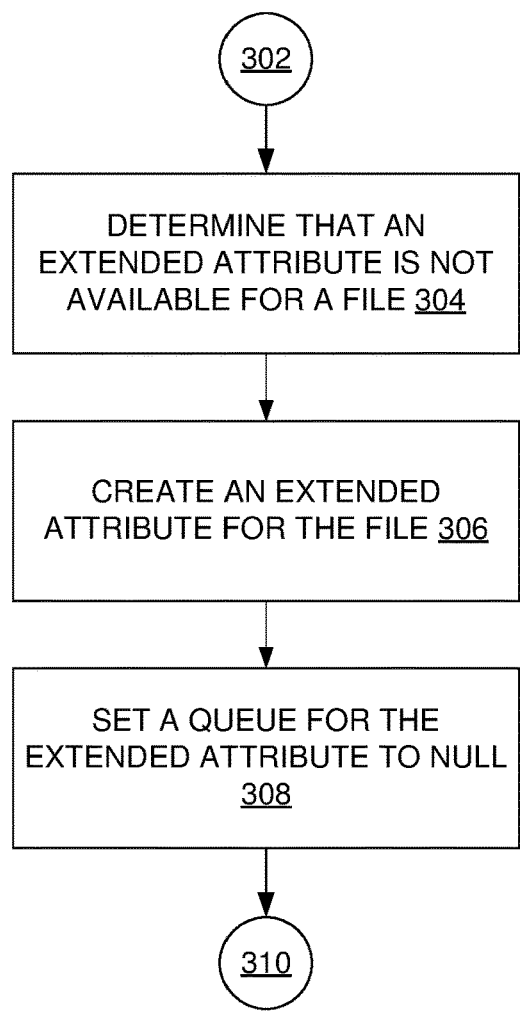
FIG. 3 illustrates another example process flow for processing a file for tiering to facilitate user-based data tiering, in accordance with certain embodiments of this disclosure.
Figure 4:
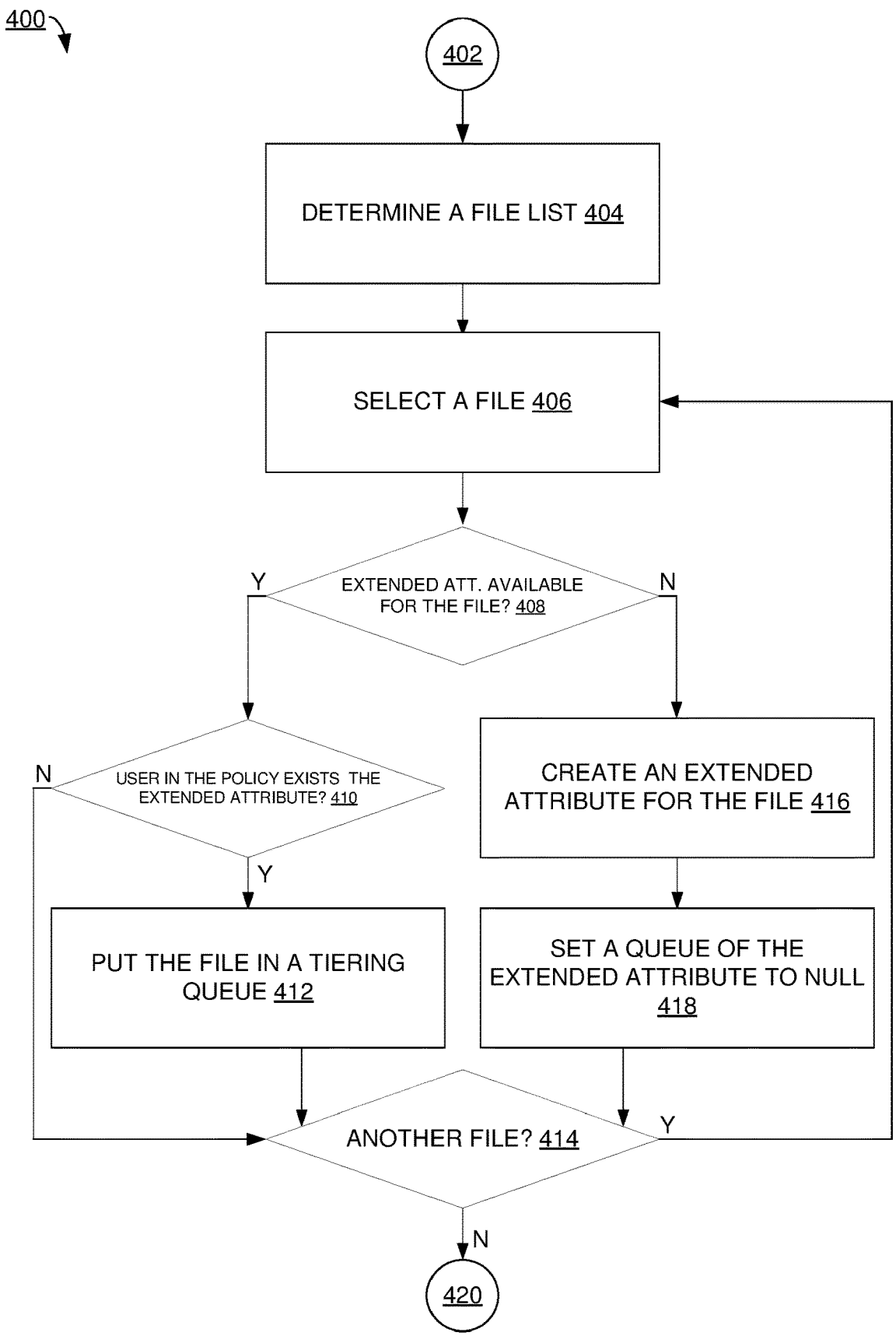
FIG. 4 illustrates example process flow for performing user-aware tiering to facilitate user-based data tiering, in accordance with certain embodiments of this disclosure.
Figure 5:
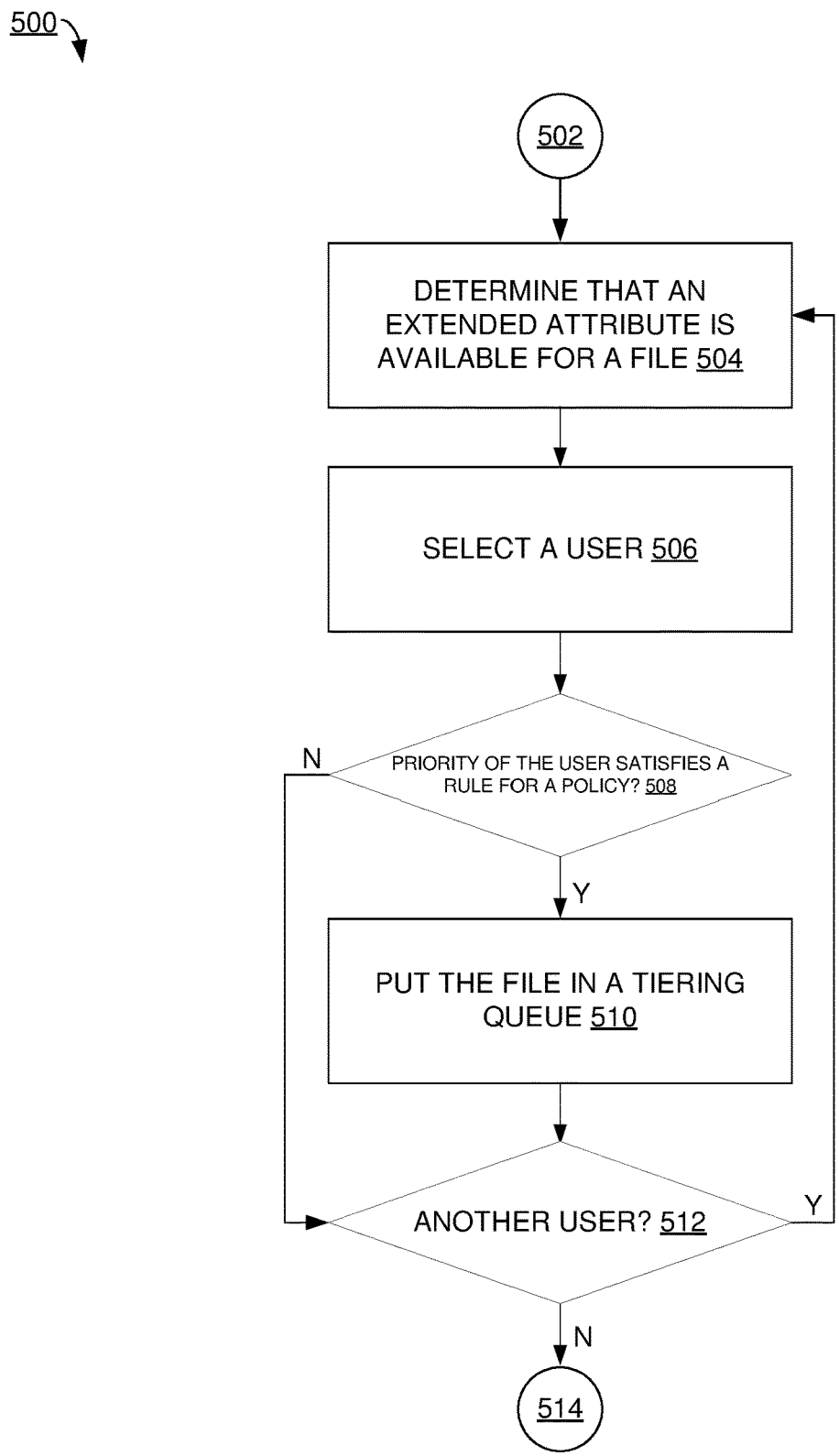
FIG. 5 illustrates an example process flow for processing a file for user-priority-aware tiering to facilitate user-based data tiering, in accordance with certain embodiments of this disclosure.
Figure 6:
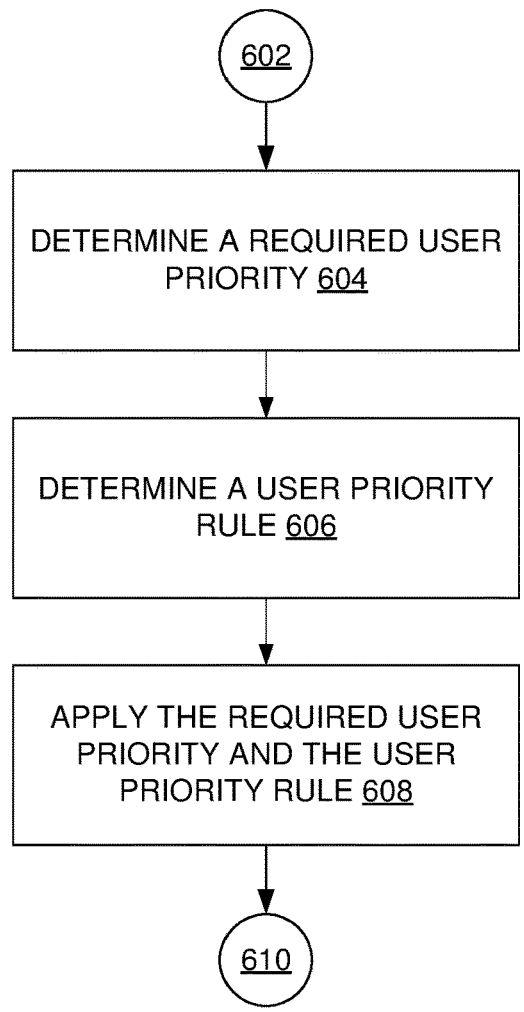
FIG. 6 illustrates an example process flow for determining user priority tiering standards to facilitate user-based data tiering, in accordance with certain embodiments of this disclosure.
Figure 7:
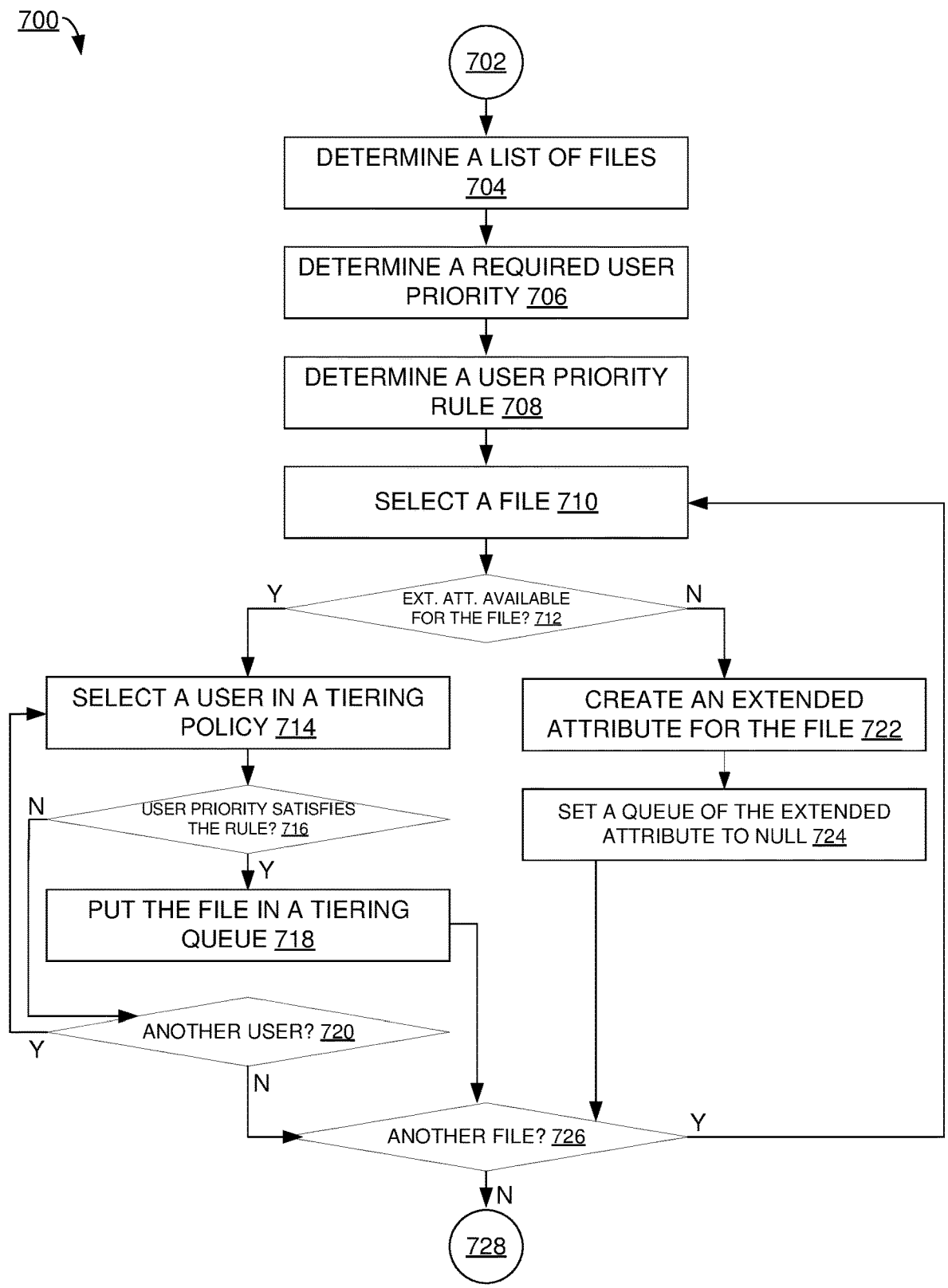
FIG. 7 illustrates example process flow for performing user-priority-aware tiering to facilitate user-based data tiering, in accordance with certain embodiments of this disclosure.
Figure 8:
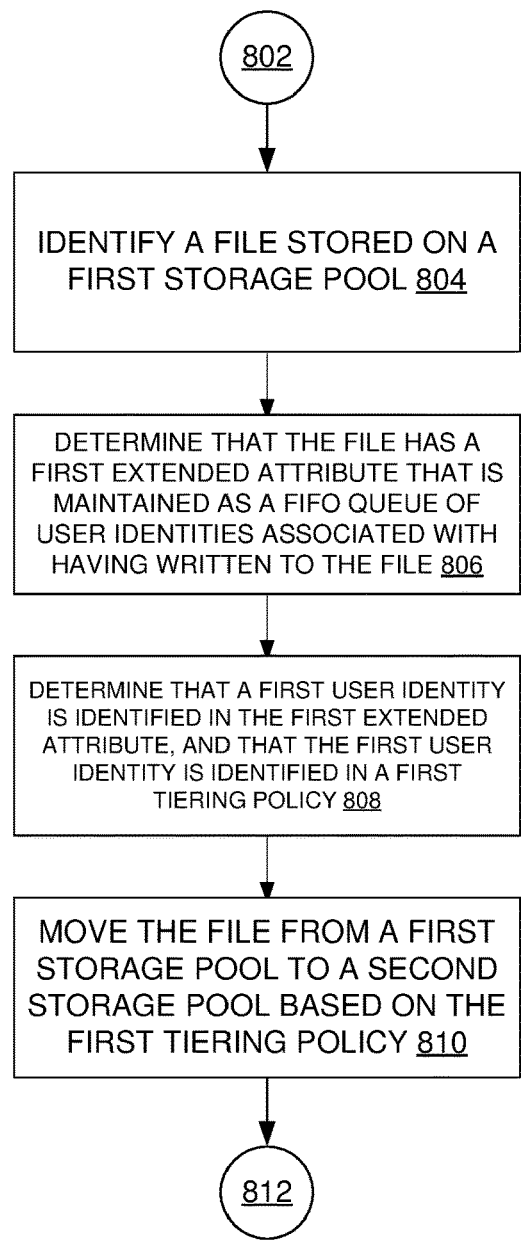
FIG. 8 illustrates an example process flow for user-based data tiering, in accordance with certain embodiments of this disclosure.
Figure 9:
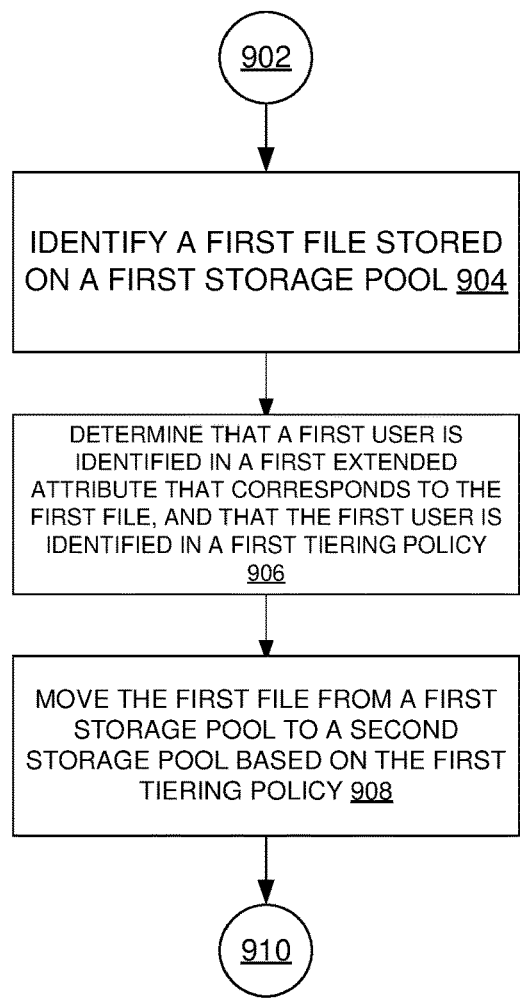
FIG. 9 illustrates another example process flow for user-based data tiering, in accordance with certain embodiments of this disclosure.
Figure 10:
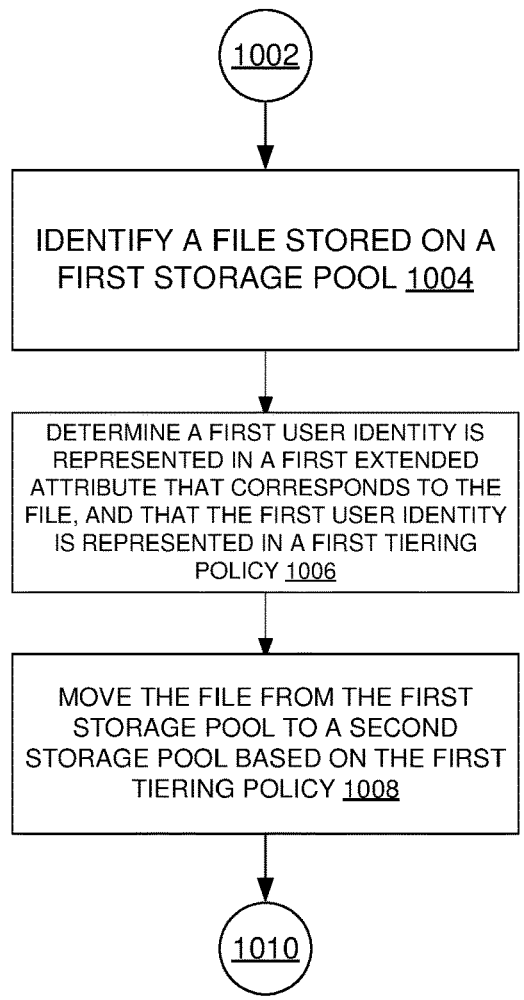
FIG. 10 illustrates another example process flow for user-based data tiering, in accordance with certain embodiments of this disclosure.

In implementing user-based data tiering in this manner, data tiering component 108 can implement aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Example Process Flows

FIG. 2 illustrates an example process flow 200 for processing a file for tiering to facilitate user-based data tiering, in accordance with certain embodiments of this disclosure. In some examples, aspects of process flow 200 can be implemented by data tiering component 108 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 200 begins with 202, and moves to operation 204. Operation 204 depicts determining that an extended attribute is available for a file. In some examples a file system can comprise Modes, which identify data blocks that comprise a file, and extended attributes (data blocks that store metadata about the file(s) of the Mode). In such examples, the extended attribute of operation 204 can be an extended attribute used to log recent modifications of the file, and it can have a known name. Determining that an extended attribute is available for the file can comprise determining that the file's Mode stores an extended attribute with a known name that is used to log recent modifications of the file. After operation 204, process flow 200 moves to operation 206.

Operation 206 depicts determining that a user identified in a policy exists in a file modification queue. A policy can be defined in the manner of policy TP1 as described herein. In such examples where users of the policy are enumerated, each user (e.g., charlie) can be searched for in the log of users who have recently modified the file from operation 204. Operation 206 can comprise determining that there is a match between at least one user identified in the policy, and at least one user identified in the log. After operation 206, process flow 200 moves to operation 208.

Operation 208 depicts putting the file in a tiering queue. A tiering queue can be distinguished from a queue used to log which users have recently accessed a particular file. A tiering queue can comprise a list of files that will be processed for tiering, such as to be moved between storagepool 1 110 and storagepool 2 112 of FIG. 1. In such examples, putting the file in the tiering queue can comprise adding an identifier of the file to a list of files for which tiering will be performed according to the relevant tiering policy. After operation 208, process flow 200 moves to 210, where process flow 200 ends.

FIG. 3 illustrates another example process flow 300 for processing a file for tiering to facilitate user-based data tiering, in accordance with certain embodiments of this disclosure. In some examples, aspects of process flow 300 can be implemented by data tiering component 108 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 300 begins with 302, and moves to operation 304. Operation 304 depicts determining that an extended attribute is not available for a file. In some examples, operation 304 can be implemented in a similar manner as operation 204 of FIG. 2, but where the determination is that an extended attribute is not available for a file, whereas in operation 204 the determination is that the extended attribute is available for the file. That is, operation 304 can comprise determining that the Mode that corresponds to the file lacks an extended attribute with a known name that logs recent user accesses of the file. After operation 304, process flow 300 moves to operation 306.

Operation 306 depicts creating an extended attribute for the file. In some examples, operation 306 can comprise adding an extended attribute to an Mode that corresponds to the file, where the extended attribute has a known name for being used to log recent user accesses of the file. After operation 306, process flow 300 moves to operation 308.

Operation 308 depicts setting a queue for the extended attribute to Null. The extended attribute can be created as a queue, and this queue can be set to have no elements initially, which can be referred to as being set to Null. After operation 308, process flow 300 moves to 310, where process flow 300 ends.

FIG. 4 illustrates example process flow 400 for performing user-aware tiering to facilitate user-based data tiering, in accordance with certain embodiments of this disclosure. In some examples, aspects of process flow 400 can be implemented by data tiering component 108 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 400 begins with 402, and moves to operation 404. Operation 404 depicts determining a file list. This file list can be a set of files defined by a particular tiering policy. Using the example of tiering policy TP1, this file list can be all files in directory /ifs/data1. These files can be enumerated with an operation such as 'ls' in UNIX-type operating systems. After operation 404, process flow 400 moves to operation 406.

Operation 406 is reached from operation 404 or operation 414 (where it is determined that there is another file). Operation 406 depicts selecting a file. In some examples, the file list of 404 has an order, and operation 406 can comprise selecting a first (or next) file from this file list that has not yet been evaluated in a current iteration of performing process flow 400. After operation 406, process flow 400 moves to operation 408.

Operation 408 depicts determining whether an extended attribute is available for the file. In some examples, operation 408 can be implemented in a similar manner as operation 204 of FIG. 2, and operation 304 of FIG. 3. Where it is determined in operation 408 that an extended attribute is available for the file, process flow 400 moves to operation 410. Instead, where it is determined in operation 408 that an extended attribute is not available for the file, process flow 400 moves to operation 416.

Operation 410 is reached from operation 408 where it is determined that an extended attribute is available for the file. Operation 410 depicts determining whether a user in the policy exists in the extended attribute. In some examples, operation 410 comprises determining whether a user identified in the policy exists in a queue of the extended attribute. In some examples, operation 410 can be implemented in a similar manner as operation 206 of FIG. 2 (which depicts determining that a user identified in a policy exists in a file modification queue). Where it is determined in operation 410 that a user identified in the policy exists in a queue of the extended attribute, process flow 400 moves to operation 412. Instead, where it is determined in operation 410 that a user identified in the policy does not exist in a queue of the extended attribute, process flow 400 moves to operation 414.

Operation 412 is reached from operation 410 where it is determined that a user identified in the policy exists in a queue of the extended attribute. Operation 412 depicts putting the file in a tiering queue. In some examples, operation 412 can be implemented in a similar manner as operation 208 of FIG. 2. After operation 412, process flow 400 moves to operation 414.

Operation 414 is reached from operation 410 (where it is determined that a user identified in the policy does not exist in a queue of the extended attribute), operation 412, or operation 418. Operation 414 depicts determining whether there is another file. This can be another file in the file list of operation 404 that has not yet been evaluated in a current iteration of process flow 400.

Where it is determined in operation 414 that there is another file, process flow 400 returns to operation 406. In this manner, loops from operation 406 through operation 414 (including operations 406-418) can be performed to evaluate each file specified by a tiering policy. Instead, where it is determined in operation 414 that there is not another file, process flow 400 moves to 420, where process flow 400 ends.

Operation 416 is reached from operation 408 where it is determined that an extended attribute is not available for the file. Operation 416 depicts creating an extended attribute for the file. In some examples, operation 416 can be implemented in a similar manner as operation 306 of FIG. 3. After operation 416, process flow 400 moves to operation 418.

Operation 418 depicts setting a queue of the extended attribute to Null. In some examples, operation 418 can be implemented in a similar manner as operation 308 of FIG. 3. After operation 418, process flow 400 moves to operation 414.

FIG. 5 illustrates an example process flow 500 for processing a file for user-priority-aware tiering to facilitate user-based data tiering, in accordance with certain embodiments of this disclosure. In some examples, aspects of process flow 500 can be implemented by data tiering component 108 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, and process flow 1000 of FIG. 10.

Process flow 500 begins with 502, and moves to operation 504. Operation 504 depicts determining that an extended attribute is available for a file. In some examples, operation 504 can be implemented in a similar manner as operation 204 of FIG. 2. After operation 504, process flow 500 moves to operation 506.

Operation 506 is reached from operation 504 or operation 512 (where it is determined that there is another user). Operation 506 depicts selecting a user. This can be a user who is logged as having recently modified a particular file.

Where the users are specified in a queue or an ordered list, operation 506 can comprise selecting a first (or next) user from the list that has not yet been evaluated in the current iteration of process flow 500. After operation 506, process flow 500 moves to operation 508.

Operation 508 depicts determining whether a priority of the user satisfies a rule for a policy. Using the example of tiering policy TP2, the rule can be that a user has a priority less than 7 (i.e., Users_TP2_Priority: 7 and Rule: "<" in tiering policy TP2). This rule can be compared to a priority of the selected user from operation 506 to determine whether that user has a priority that satisfies the rule of the policy.

Where it is determined in operation 508 that a priority of the user satisfies a rule for a policy, process flow 500 moves to operation 510. Instead, where it is determined in operation 508 that a priority of the user does not satisfy a rule for a policy, process flow 500 moves to operation 512.

Operation 510 depicts putting the file in a tiering queue. In some examples, operation 510 can be implemented in a similar manner as operation 208 of FIG. 2. After operation 510, process flow 500 moves to operation 512.

Operation 512 is reached from operation 508 (where it is determined that a priority of the user does not satisfy a rule for a policy) or from operation 510. Operation 512 depicts determining whether there is another user. Using the example of operation 506, this can comprise determining whether there is another user in the queue of users who have recently modified a particular file that has not been evaluated in the current iteration of process flow 500.

Where it is determined in operation 512 that there is another user, process flow 500 moves to operation 506. In this manner, loops from operation 506 through operation 512 (including operations 502-512) can be performed to evaluate each file specified by a tiering policy. Instead, where it is determined in operation 512 that there is not another user, process flow 500 moves to 514, where process flow 500 ends.

FIG. 6 illustrates an example process flow 600 for determining user priority tiering standards to facilitate user-based data tiering, in accordance with certain embodiments of this disclosure. In some examples, aspects of process flow 600 can be implemented by data tiering component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, and process flow 1000 of FIG. 10.

Process flow 600 begins with 602, and moves to operation 604. Operation 604 depicts determining a required user priority. Using the example of tiering policy TP2, this can comprise parsing tiering policy TP2 for the required user priority, which can be 7 (Users_TP2_Priority: 7). After operation 604, process flow 600 moves to operation 606.

Operation 606 depicts determining a user priority rule. Using the example of tiering policy TP2, this can comprise parsing tiering policy TP2 for the user priority rule, which can be "less than" (Rule: "<"). After operation 606, process flow 600 moves to operation 608.

Operation 608 depicts applying the required user priority and the user priority rule. In some examples, operation 608 can be implemented in a similar manner as operation 508 and operation 510 of FIG. 10. After operation 608, process flow 600 moves to 610, where process flow 600 ends.

FIG. 7 illustrates example process flow 700 for performing user-priority-aware tiering to facilitate user-based data tiering, in accordance with certain embodiments of this disclosure. In some examples, aspects of process flow 700 can be implemented by data tiering component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, and process flow 1000 of FIG. 10.

Process flow 700 begins with 702, and moves to operation 704. Operation 704 depicts determining a list of files. In some examples, operation 704 can be implemented in a similar manner as operation 404 of FIG. 4. After operation 704, process flow 700 moves to operation 706.

Operation 706 depicts determining a required user priority. In some examples, operation 706 can be implemented in a similar manner as operation 604 of FIG. 6. After operation 706, process flow 700 moves to operation 708.

Operation 708 depicts determining a user priority rule. In some examples, operation 708 can be implemented in a similar manner as operation 606 of FIG. 6. After operation 708, process flow 700 moves to operation 710.

Operation 710 is reached from operation 708 or from operation 726 (where it is determined that there is another file). Operation 710 depicts selecting a file. In some examples, operation 710 can be implemented in a similar manner as operation 406 of FIG. 4. After operation 710, process flow 700 moves to operation 712.

Operation 712 depicts determining whether an extended attribute is available for the file. In some examples, operation 712 can be implemented in a similar manner as operation 408 of FIG. 4. Where it is determined in operation 712 that an extended attribute is available for the file, process flow 700 moves to operation 714. Instead, where it is determined in operation 712 that an extended attribute is not available for the file, process flow 700 moves to operation 722.

Operation 714 is reached from operation 712 where it is determined that an extended attribute is available for the file. Operation 714 depicts selecting a user in a tiering policy. In some examples, operation 714 can be implemented in a similar manner as operation 506 of FIG. 5. After operation 714, process flow 700 moves to operation 716.

Operation 716 depicts determining whether the priority of the user satisfies the rule. In some examples, operation 716 can be implemented in a similar manner as operation 508 of FIG. 5. Where it is determined in operation 716 that the priority of the user satisfies the rule, process flow 700 moves to operation 718. Instead, where it is determined in operation 716 that the priority of the user does not satisfy the rule, process flow 700 moves to operation 720.

Operation 718 is reached from operation 716 where it is determined that the priority of the user satisfies the rule. Operation 718 depicts putting the file in a tiering queue. In some examples, operation 718 can be implemented in a similar manner as operation 510 of FIG. 5. After operation 718, process flow 700 moves to operation 726.

Operation 720 is reached from operation 716 where it is determined that the priority of the user does not satisfy the rule. Operation 720 depicts determining whether there is another user. In some examples, operation 720 can be implemented in a similar manner as operation 512 of FIG. 5. Where it is determined in operation 720 that there is another user, process flow 700 moves to operation 714. Instead, where it is determined in operation 720 that there is not another user, process flow 700 moves to operation 726.

Operation 722 is reached from operation 712 where it is determined that an extended attribute is not available for the file. Operation 722 depicts creating an extended attribute for the file. In some examples, operation 722 can be implemented in a similar manner as operation 306 of FIG. 3. After operation 722, process flow 700 moves to operation 724.

Operation 724 depicts setting a queue of the extended attribute to Null. In some examples, operation 724 can be implemented in a similar manner as operation 308 of FIG. 3. After operation 724, process flow 700 moves to operation 726.

Operation 726 is reached from operation 718, operation 720 (where it is determined that there is not another user), or operation 724. Operation 726 depicts determining whether there is another file. In some examples, operation 726 can be implemented in a similar manner as operation 414 of FIG. 4. Where it is determined in operation 726 that there is another file, process flow 700 moves to operation 710. Instead, where it is determined in operation 726 that there is not another file, process flow 700 moves to 728, where process flow 700 ends.

FIG. 8 illustrates an example process flow 800 for user-based data tiering, in accordance with certain embodiments of this disclosure. In some examples, aspects of process flow 800 can be implemented by data tiering component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, and process flow 1000 of FIG. 10.

Process flow 800 begins with 802, and moves to operation 804. Operation 804 depicts identifying a file stored on a first storagepool. This can be a file stored in a file system and operation 804 can be performed as part of analyzing files governed by a tiering policy for whether they should be moved to a different storagepool as part of that tiering policy. After operation 804, process flow 800 moves to operation 806.

Operation 806 depicts determining that the file has a first extended attribute that is maintained as a first-in-first-out (FIFO) queue of user identities associated with having written to the file. This can be a queue that is used to log which users have most recently modified the file. After operation 806, process flow 800 moves to operation 808.

Operation 808 depicts determining that a first user identity is identified in the first extended attribute, and that the first user identity is identified in a first tiering policy. In some examples, operation 808 comprises determining that a first user identity is identified in the first extended attribute, and that the first user identity is identified in a first tiering policy, the first tiering policy specifying a criterion for transfer of files between the first storagepool and a second storagepool, the first storagepool providing a different performance level than the second storagepool. That is, the first extended attribute can identify which users have recently modified a file. And the first tiering policy can identify which users are governed by the tiering policy. In such examples, operation 808 can comprise determining that any user is identified in both the first extended attribute and the first tiering policy.

In some examples, operation 808 comprises determining that a system-wide setting indicates that user identities associated with having written to files indicates that tracking is to be performed. That is, there can be a global setting that indicates whether tracking is to be performed.

In some examples, operation 808 comprises determining that the file is not identified in a list of files for which tracking is not to be performed, determining that the first user identity is not identified in a list of user identities for which tracking is not to be performed. That is, it can be determined that the file is not found in a blacklist of files for which tracking is not to be performed, and that the user identify is not found in a blacklist of files for which tracking is not to be performed. Where it is the case that the global setting is off, or that the file and/or user identity are in a blacklist, in some examples, process flow 800 can omit further processing the file for tiering under the tiering policy. After operation 808, process flow 800 moves to operation 810.

Operation 810 depicts moving the file from the first storagepool to the second storagepool based on the first tiering policy.

In some examples, the first user identity is one of a first group of user identities identified in the first extended attribute, and the first user identity is one of a second group of user identities identified in a second extended attribute. In such examples, operation 810 can comprise moving the file based on the first tiering policy where any of the user identities in the first group of user identities matches any of the user identities in the second group of user identities. That is, a tiering policy can identify multiple users, and an extended attribute can identify multiple users who have recently modified the file. In some examples, file can be moved according to the tiering policy where any user in the tiering policy matches any user who has recently modified the file.

In some examples, operation 810 comprises processing the file for movement from the first storagepool to the second storagepool based on a group of tiering policies that comprises the first tiering policy. That is, one file can be governed by multiple tiering policies.

In some examples, operation 810 comprises creating the third extended attribute that corresponds to the file in response to a second user identity being determined to be associated with modifying the file, the second user identity being identified in the third tiering policy. In some examples, a queue for a tiering policy and file is created not upon creation of the policy, or necessarily upon file creation, but upon a modification of the file by a user governed by the policy. So, a queue for that file and policy might not exist because such a modification has not yet been made since both the file and the tiering policy were created (where creating a file itself can be a modification that is logged).

Where a user governed by a tiering policy is a user that creates the file, operation 810 can comprise adding identifier data representative of the second user identity to the third extended attribute. That is, the second user can be added to the queue for the file and the third tiering policy when creating the queue.

In some examples, operation 810 comprises processing the file for movement from the first storagepool to the second storagepool based on a group of tiering policies that comprises the first tiering policy and a second tiering policy. That is, there can be multiple tiering policies that govern one file.

In some examples, operation 810 comprises performing the processing of the file for movement from the first storage to the second storagepool in response to determining that the file meets a criteria of the first tiering policy and fails to meet a criteria of the second tiering policy. That is, a file can be processed for tiering when it meets the criteria of one or more of the tiering policies that govern it.

In some examples, the file is analyzed according to the first tiering policy based on the first extended attribute, and wherein the file is analyzed according to the second tiering policy based on the first extended attribute. That is, multiple tiering policies can all access the same queue of users who have modified the file for determining whether the file is to be tiered.

After operation 810, process flow 800 moves to 812, where process flow 800 ends.

FIG. 9 illustrates another example process flow 900 for user-based data tiering, in accordance with certain embodiments of this disclosure. In some examples, aspects of process flow 900 can be implemented by data tiering component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and process flow 1000 of FIG. 10.

Process flow 900 begins with 902, and moves to operation 904. Operation 904 depicts identifying a first file stored on a first storagepool. In some examples, operation 904 can be implemented in a similar manner as operation 804 of FIG. 8. After operation 904, process flow 900 moves to operation 906.

Operation 906 depicts determining that a first user is identified in a first extended attribute that corresponds to the first file, and that the first user is identified in a first tiering policy. In some examples, operation 906 depicts determining that a first user is identified in a first extended attribute that corresponds to the first file, and that the first user is identified in a first tiering policy, the first tiering policy identifying a criterion for transferring files between the first storagepool and a second storagepool, the first storagepool providing a different performance level than the second storagepool. In some examples, operation 906 can be implemented in a similar manner as operations 806 and 808 of FIG. 8.

In some examples at least one data block of the first file is identified in an Mode of a file system, the Mode identifying at least one data block of the first extended attribute. In some examples, the first extended attribute stores metadata about the first file. That is a file system can store files using Modes, and an Mode that stores file data can also be used to store the corresponding extended attribute, which can store metadata about that file.

In some examples the first tiering policy defines a user priority threshold for performance of tiering. That is, user-priority-aware tiering can be implemented, where a tiering policy specifies a requisite user priority for tiering, and tiering is performed on the first file because the first user (who recently modified the first file) has that requisite user priority.

In some examples, operation 906 comprises performing the moving of the first file from the first storagepool to the second storagepool based on determining that the first user has a priority below the user priority threshold. That is, the tiering policy can specify that tiering is performed for files with recently-modifying users below a threshold (e.g., <7 in tiering policy TP2), and in this example the first user can have a priority below that threshold.

In some examples, the first extended attribute that is maintained as a FIFO queue of users associated with user devices that have written to the first file.

After operation 906, process flow 900 moves to operation 908.

Operation 908 depicts moving the first file from the first storagepool to the second storagepool based on the first tiering policy. In some examples, operation 908 can be implemented in a similar manner as operation 810 of FIG. 8.

In some examples, operation 908 comprises determining to refrain from move a second file from the first storagepool to the second storagepool according to the first tiering policy in response to determining that no user identified in the first tiering policy is found in a second extended attribute of the second file that corresponds to the first tiering policy. That is, in some examples, a file is not processed for tiering because no user who has recently modified the file matches a user governed by the tiering policy.

After operation 908, process flow 900 moves to 910, where process flow 900 ends.

FIG. 10 illustrates another example process flow 1000 for user-based data tiering, in accordance with certain embodiments of this disclosure. In some examples, aspects of process flow 1000 can be implemented by data tiering component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and process flow 900 of FIG. 9.

Process flow 1000 begins with 1002, and moves to operation 1004. Operation 1004 depicts identifying a file stored on a first storagepool. In some examples, operation 1004 can be implemented in a similar manner as operation 804 of FIG. 8.

In some examples, the first storagepool provides a different performance level than a second storagepool. That is, in some examples, the first storagepool can be cheaper to implement than the second storagepool in terms of money and time spent; the first storagepool can provide faster access to data than the second storagepool; or the first storagepool can provide greater reliability of data than the second storagepool. After operation 1004, process flow 1000 moves to operation 1006.

Operation 1006 depicts determining a first user identity is represented in a first extended attribute that corresponds to the file, and that the first user identity is represented in a first tiering policy. In some examples, operation 1006 can be implemented in a similar manner as operations 806 and 808 of FIG. 8.

In some examples, the first tiering policy identifies a criterion for transfer of files between the first storagepool and the second storagepool. In some examples, this criterion can be a particular user who has recently modified the file (such as in tiering policy TP1) or a user priority threshold of users who have recently modified the file (such as in tiering policy TP2). After operation 1006, process flow 1000 moves to operation 1008.

Operation 1008 depicts moving the file from the first storagepool to a second storagepool based on the first tiering policy. In some examples, operation 1008 can be implemented in a similar manner as operation 810 of FIG. 8.

In some examples, the first tiering policy defines a user priority threshold for performance of tiering. In some examples, operation 1008 comprises performing the moving of the file from the first storagepool to the second storagepool based on determining that the first user identity has a priority specified by the user priority threshold. That is, a tiering policy can implement a user priority threshold, such as with tiering policy TP2.

In some examples, the first user identity is one of a first group of user identities identified in the first extended attribute, and the first user identity is one of a second group of user identities identified in a second extended attribute. In such examples, operation 1008 can comprise moving the file based on the first tiering policy where any user identity in the first group of user identities matches any user identity in the second group of user identities. That is, a file can be processed for tiering for a particular tiering policy where any user that has recently modified the file is governed by the tiering policy.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102, server 106, data tiering component 108, storagepool 1 110, and/or storagepool 2 112 of FIG. 1. In some examples, computing environment 1100 can implement aspects of the process flows of FIGS. 2-10 to facilitate user-based data tiering.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
identifying a file stored on a first storagepool;
determining that the file has a first extended attribute that is maintained as a first-in-first-out (FIFO) queue of user identities associated with having written to the file, wherein an inode of the first storagepool identifies a first data block of the first storagepool that stores at least part of the file, and a second data block of the first storagepool that stores the first extended attribute;
determining that a first user identity is identified in the first extended attribute, and that the first user identity is identified in a first tiering policy, the first tiering policy specifying a criterion for transfer of files between the first storagepool and a second storagepool, the first storagepool providing a different performance level than the second storagepool; and
moving the file from the first storagepool to the second storagepool based on the first tiering policy.

2. The system of claim 1, wherein the first user identity is one of a first group of user identities identified in the first extended attribute, wherein the first user identity is one of a second group of user identities identified in a second extended attribute, and wherein the operations further comprise:
moving the file based on the first tiering policy where any of the user identities in the first group of user identities matches any of the user identities in the second group of user identities.

3. The system of claim 1, wherein the operations further comprise:
processing the file for movement from the first storagepool to the second storagepool based on a group of tiering policies that comprises the first tiering policy and a second tiering policy.

4. The system of claim 3, wherein the operations further comprise:
performing the processing of the file for movement from the first storagepool to the second storagepool in response to determining that the file meets a criteria of the first tiering policy and fails to meet a criteria of the second tiering policy.

5. The system of claim 3, wherein the file is analyzed according to the first tiering policy based on the first extended attribute, and wherein the file is analyzed according to the second tiering policy based on the first extended attribute.

6. The system of claim 1, wherein the first tiering policy indicates a user-aware heat score for moving the file from the first storage pool to the second storagepool, the user-aware heat score being based on a number of accesses of the file and user priorities of user identities of the FIFO queue of user identities.

7. The system of claim 6, wherein the operations further comprise:
determining that the file is not identified in a list of files for which tracking is not to be performed; and
determining that the first user identity is not identified in a list of user identities for which tracking is not to be performed.

8. A method, comprising:
identifying, by a system comprising a processor, a first file stored on a first storagepool;
determining, by the system, that a first user is identified in a first extended attribute that corresponds to the first file, and that the first user is identified in a first tiering policy, the first tiering policy identifying a criterion for transferring files between the first storagepool and a second storagepool, the first storagepool providing a different performance level than the second storagepool, and wherein an inode of the first storagepool identifies a first data block of the first storagepool that stores at least part of the first file, and a second data block of the first storagepool that stores the first extended attribute; and
moving, by the system, the first file from the first storagepool to the second storagepool based on the first tiering policy.

9. The method of claim 8, further comprising:
determining, by the system, to refrain from move a second file from the first storagepool to the second storagepool according to the first tiering policy in response to determining that no user identified in the first tiering policy is found in a second extended attribute of the second file that corresponds to the first tiering policy.

10. The method of claim 8, wherein at least one data block of the first file is identified in an inode of a file system, the inode identifying at least one data block of the first extended attribute.

11. The method of claim 8, wherein the first extended attribute stores metadata about the first file.

12. The method of claim 8, wherein the first tiering policy defines a user priority threshold for performance of tiering.

13. The method of claim 12, further comprising:
performing, by the system, the moving of the first file from the first storagepool to the second storagepool based on determining that the first user has a priority below the user priority threshold.

14. The method of claim 8, wherein the first extended attribute that is maintained as a first-in-first-out (FIFO) queue of users associated with user devices that have written to the first file.

15. A non-transitory computer-readable medium comprising instructions that, in response to execution, cause a system comprising a processor to perform operations, comprising:

identifying a file stored on a first storagepool;

determining that a first user identity is represented in a first extended attribute that corresponds to the file, and that the first user identity is represented in a first tiering policy, wherein a data structure of the first storagepool identifies a first data block of the first storagepool that stores at least part of the file, and a second data block of the first storagepool that stores the first extended attribute; and moving the file from the first storagepool to a second storagepool based on the first tiering policy.

16. The non-transitory computer-readable medium of claim 15, wherein the first tiering policy identifies a criterion for transfer of files between the first storagepool and the second storagepool.

17. The non-transitory computer-readable medium of claim 15, wherein the first storagepool provides a different performance level than the second storagepool.

18. The non-transitory computer-readable medium of claim 15, wherein the first tiering policy defines a user priority threshold for performance of tiering.

19. The non-transitory computer-readable medium of claim 18, wherein the operations further comprise:
performing the moving of the file from the first storagepool to the second storagepool based on determining that the first user identity has a priority specified by the user priority threshold.

20. The non-transitory computer-readable medium of claim 15, wherein the first user identity is one of a first group of user identities identified in the first extended attribute, wherein the first user identity is one of a second group of user identities identified in a second extended attribute, and wherein the operations further comprise:
moving the file based on the first tiering policy where any user identity in the first group of user identities matches any user identity in the second group of user identities.

* * * * *